`US008083053B2`

(12) United States Patent
Paardekooper et al.

(10) Patent No.: US 8,083,053 B2
(45) Date of Patent: Dec. 27, 2011

(54) MODULARLY CONSTRUCTED CONVEYOR BELT, AND MODULE

(75) Inventors: Jacobus Gerardus Maria Paardekooper, Wassenaar (NL); Germ Buter, Alkmaar (NL)

(73) Assignee: Ammeraal Beltech B.V., Heerhugowaard (NL)

( * ) Notice: Subject to any disclaimer, the term of this patent is extended or adjusted under 35 U.S.C. 154(b) by 661 days.

(21) Appl. No.: 12/199,377

(22) Filed: Aug. 27, 2008

(65) Prior Publication Data

US 2009/0057108 A1    Mar. 5, 2009

(51) Int. Cl.
| | |
|---|---|
| B65G 17/38 | (2006.01) |
| B65G 17/06 | (2006.01) |
| B65G 21/18 | (2006.01) |
| B65G 13/02 | (2006.01) |
| B65G 23/14 | (2006.01) |
| B65G 15/02 | (2006.01) |

(52) U.S. Cl. ......... 198/853; 198/778; 198/833; 198/831
(58) Field of Classification Search ........................ None
See application file for complete search history.

(56) References Cited

U.S. PATENT DOCUMENTS

| | | |
|---|---|---|
| 5,139,135 A | 8/1992 | Irwin et al. |
| 5,547,071 A | 8/1996 | Palmaer et al. |
| 6,006,898 A * | 12/1999 | Odink ........................... 198/853 |
| 7,070,043 B1 | 7/2006 | MacLachlan et al. |
| 2005/0241922 A1 | 11/2005 | Petrovic |

FOREIGN PATENT DOCUMENTS

| | | |
|---|---|---|
| FR | 2841882 A1 | 1/2004 |
| WO | 2004048603 A1 | 7/2004 |
| WO | WO 2004058603 A1 * | 7/2004 |

* cited by examiner

*Primary Examiner* — Gene Crawford
*Assistant Examiner* — Yolanda Cumbess
(74) *Attorney, Agent, or Firm* — Hoffmann & Baron, LLP

(57) ABSTRACT

A conveyor belt for following a conveyance path with straight and curved conveyance path sections is constructed of module rows of a module (10) or a plurality of modules situated side by side in the transverse direction of the conveyor belt. Adjacent module rows are connected to each other by means of connecting pins (42). Each module comprises a set (15) of first aligned spaced fingers (16) with transverse aperture (40), and also a set (19) of second aligned spaced fingers (20) with transverse aperture (44), which in general are disposed in a staggered position relative to the first fingers (16). The mutual distance between at least the three outermost fingers of a set situated side by side and having the same width in a set is greater than the mutual distance between fingers situated side by side at a distance from the abovementioned at least three outermost fingers. A shorter run-in length and run-out length of a curved conveyance section of the conveyance path is achieved in this way.

24 Claims, 2 Drawing Sheets

MODULARLY CONSTRUCTED CONVEYOR BELT, AND MODULE

CROSS-REFERENCE TO RELATED APPLICATIONS

This application is claims the benefit of Netherlands Application No. 1034297, filed Aug. 28, 2007, the contents of which is incorporated by reference herein.

FIELD OF THE INVENTION

The invention relates to a conveyor belt for following a conveyance path with straight and curved conveyance path sections.

BACKGROUND OF THE INVENTION

A conveyor belt is known, for example from the publication U.S. Pat. No. 5,547,071. This known conveyor belt is constructed of module rows, each module row comprising one or more modules made of plastic situated side by side in the transverse direction of the conveyor belt. Each module has a set of first aligned spaced fingers extending in a first direction from a module element disposed transversely to the longitudinal direction of the conveyor belt. A set of second aligned spaced fingers extends in the opposite direction from the base element. The second fingers are generally disposed in a staggered position relative to the first fingers. Adjacent module rows engage with each other by means of first fingers of a module and second fingers of an adjacent module etc. In the assembled state the first and second fingers of adjacent modules overlap and are situated side by side. The modules are connected to each other by means of connecting pins extending in the transverse direction of the conveyor belt through transverse apertures in the fingers. In order to make it possible for the conveyor belt to pass through curved conveyance sections of the conveyance path along which it is to travel, the transverse apertures of one of the sets of spaced fingers are elongated holes in the longitudinal direction of the conveyor belt. This makes it possible for the module rows to shift at an angle relative to each other in a bend or other curvature of the conveyance path so that the module rows collapse on the inside of the curve. In the modular conveyor belt disclosed in this publication so-called integral sideplates which are stronger than the other fingers are provided. These sideplates are formed by providing for the two outermost fingers of a set of first fingers and a finger situated between them from the other set of second fingers of an adjacent module to be made of a thicker and heavier design. The object of this construction is to enable the belt to withstand the fill tensile stress to which it is exposed in the longitudinal direction in a bend. This means that separate sideplates on the side edges of the modules are unnecessary, which results in a reduction of the production costs in terms of time.

A conveyor belt is also known from WO 2004/058603 as well as U.S. Pat. No. 5,139,135.

WO 2004/058603 shows a module for a conveyor belt, which comprises on each side a set of spaced fingers with interspaces in between. In the middle part of the module the fingers have a small width and the width of the interspace between those small fingers is correspondingly small. In the side parts of the module the fingers have a large width—measured from the drawings this large width is about 3 times the small width—while the width of the interspaces between those large fingers is correspondingly large. The form and dimensions of the small fingers are essentially the same as the form and dimensions of the small interspaces and the form, while the form and dimensions of the large fingers are essentially the same as the form and dimensions of the large interspaces.

U.S. Pat. No. 5,139,135 shows conveyor belts made of modules. Each module has on each side a set of spaced fingers with interspaces in between. The form and dimensions of the interspaces are essentially the same as the form and dimensions of the fingers. In FIG. 4 prior art and FIG. 6 of U.S. Pat. No. 5,139,135, a dual pitched conveyor belt is shown, i.e. in the inner curve section of the belt, the fingers and interspaces have a smaller pitch as well as a smaller width than in the outer curve section of the belt. This dual pitch facilitates the ability of the belt to turn around a reduced radius.

A disadvantage of known modular conveyor belts produced according to the abovementioned principle is the relatively long run-in length and run-out length of a bend, which according to current guidelines is at least 450 mm irrespective of the belt width, up to twice the width of the conveyor belt. The terms run-in length and run-out length refer to the length of the conveyance path upstream and downstream respectively of a bend or curvature which is needed for the conveyor belt to change from a straight conveyance path section into a curved conveyance path section, and vice versa. The length required for this run-in and run-out is, however, not always available and can entail further unused floor surface.

SUMMARY OF THE INVENTION

The object of the invention is to provide a conveyor belt in which the abovementioned disadvantage is lessened, or to provide a usable alternative.

To this end, the conveyor belt for following a conveyance path with straight and curved conveyance path sections is according to the invention characterized in that the mutual distance between each said at least three outermost fingers is larger than the width of each said at least three outermost fingers; and/or in that, viewed in the transverse direction of the conveyor belt, all fingers have the same width.

The conveyor belt according to the invention has a modular construction. The conveyor belt comprises module rows of one or more modules situated side by side in the transverse direction. The modules are preferably made of plastic. Adjacent module rows engage in each other and are connected to each other by transverse connecting pins extending in the transverse direction of the belt. Each module has fingers extending parallel to the direction of conveyance (longitudinal direction) of the conveyor belt, namely a first set of fingers and a second set of fingers extending in a direction opposite to that of the first set of fingers and positioned staggered relative to said first set of fingers. Each finger is provided with a transverse aperture for accommodating a connecting pin. In the fitted state the first and second fingers of adjacent module rows overlap and are situated side by side. The transverse apertures of a set of fingers of a module are usually round holes through which the connecting pin extends. The transverse apertures in the other set of fingers are slotted holes extending in the longitudinal direction of the belt, so as to adapt to lateral curvatures in the conveyor belt, the module rows shifting and collapsing at an angle relative to each other on the inside of the curvature. In this way the connecting pin concerned can shift slightly in the longitudinal direction, which permits a relative movement of the adjacent module rows with respect to each other. On the inside of a bend the module rows collapse, as it were, while on the outside the mutual distance between the module rows is greater.

According to the invention, on the one hand the distances between at least three fingers situated on an outside of a module row and having the same width of each set of fingers is greater than the distances between fingers situated closer to the centre of the module row, while on the other hand, the mutual distance between each said at least three outermost fingers is larger than the width of each said at least three outermost fingers, and/or, viewed in the transverse direction of the conveyor belt, all fingers have the same width. The fingers, which are situated closer to the centre of the module row, are positioned at a mutual distance of, for example, half an inch. In this way it is deliberately ensured that the connecting pin concerned bends slightly in the oversized spaces between the fingers disposed at a greater mutual distance as a result of the tensile force on the outside of the conveyor belt in a curved part of the conveyance path, and consequently this connecting pin does not only touch the outermost finger of adjacent modules, but also goes against the wall which delimits a transverse aperture of at least two fingers situated further inwards. It was found from experiments with a conveyor belt according to U.S. Pat. No. 5,547,071 and a conveyor belt according to the invention that with the same run-out length of a curved conveyance path section the load in the case of the conveyor belt according to the invention is lower than that in the case of the conveyor belt constructed of module rows with integral sideplates. This permits a shorter run-in length and run-out length in the case of the conveyor belt according to the invention, so that a more compact construction of the total conveyor system is possible. Moreover, it means that the tensile force is not absorbed by the outermost fingers alone, but is also distributed over a number of fingers. In case said at least outermost fingers are, in a curved part of the conveyance path, at the inner curve side of the curved part, the oversized spaces between the fingers reduce the chance that problems are caused by dirt, objects etcetera becoming stuck between the engaging fingers of two adjacent modules.

It is pointed out here that in the case of the known conveyor belt described above only the outermost two fingers of the first set of fingers and the outermost finger of the second set of fingers lying between said outermost fingers are broader than the remaining fingers, and whilst it is true that the distance between said outermost fingers of a set is thereby greater than that between fingers situated further towards the centre, the conveyor belt according to the invention differs from this in that all fingers, including the outermost fingers of a set of fingers, have the same width. This is also necessary in the case of the invention because otherwise insufficient bending of the connecting pin could occur.

It is pointed out incidentally that a module in which the central finger is made wider is known in the art. This makes it possible to divide the module into two equal parts by dividing said finger through the middle in the longitudinal direction, for example by sawing. This means that the width of the conveyor belt, which in principle is a whole number of times the standard width (e.g. 6 inches) of a module, can also be adapted with a half width. This is also possible in the case of the invention.

All fingers are of the same width, such as 6, 12 or 15 mm.

In an advantageous embodiment a set of aligned spaced fingers in a module row comprises first sub-groups of a plurality of fingers (at least three) on one or both side edges of the module concerned, and a second sub-group of a plurality of fingers adjacent the above mentioned first sub-group respectively between the abovementioned first sub-groups, the distance between the fingers of the first sub-group being greater than the distance between the fingers of the second sub-group. In this embodiment the distance between the fingers of the second sub-group is advantageously the same. A conveyor belt according to the invention constructed with first sub-groups of fingers on both side edges is suitable for travelling along a conveyance path with bends or curvatures bending in several directions (left and right).

According to a particularly advantageous embodiment, the distance between the outermost fingers concerned, in particular that of a first sub-group, decreases stepwise, viewed in a direction from the side edge of a module towards the second sub-group of fingers.

According to a further embodiment, it is advantageous when, viewed in the transverse direction of the conveyor belt and in the direction of the side edge of a module, the distance between the fingers of the first sub-group increases stepwise with a factor of about 1.1 to 1.4 with respect to each other. Preferably said factor is in the range of about 1.1-1.2. Assuming the said factor is constant at 1.1, this means that when in an interspace between two fingers the distance between these fingers is 10 mm and going to the side edge, the distance between the fingers in the directly adjacent interspace is 11 mm, the distance between the fingers in the next interspace is 12.1 mm, etc. However, it is to be noted that said factor does not need to be constant, the said factor can vary, within the mentioned ranges, from interspace to interspace.

The conveyor belt, at least one or more modules of said conveyor belt, is advantageously provided with hold-down means, so called hold-down tabs, for holding the conveyor belt flat. These are advantageously hook-shaped projections near the side edges of a conveyor belt, which engage below guides disposed underneath the conveyance path and prevent the outside edge of a conveyor belt from being drawn up at a curved conveyance path section.

The invention also relates to a module, obviously intended for a conveyor belt according to the invention, preferably made of plastic, in which each module comprises a set of first aligned spaced fingers extending in a first direction from the module, and also a set of second aligned spaced fingers extending in a direction opposite to the first direction and in general disposed in a staggered position relative to the first fingers, in which the fingers are provided with transverse apertures, in which the transverse apertures of one of the sets of spaced fingers are elongated slotted holes in the longitudinal direction of the conveyor belt, in which the mutual distance between at least the three outermost fingers of a set having the same width is greater than the mutual distance between fingers situated side by side at a distance from the abovementioned at least three outermost fingers, and in which the mutual distance between each said at least three outermost fingers is larger than the width of each said at least three outermost fingers. The module according to the invention is a base element for the production of a conveyor belt according to the invention with all its advantages, such as described above.

In general, the base element of a module extending transversely to the direction of conveyance in the fitted state will itself be able to bend slightly in the longitudinal direction. This can be achieved by correct selection of the depth/width of the base element and the type of materials used, such as the type of plastic etc. All plastics customarily used in the art for modular conveyor belts are suitable for use as the plastic material. This also applies to the choice of material for the connecting pin.

BRIEF DESCRIPTION OF THE DRAWINGS

The invention will be explained in greater detail below with reference to the appended drawings, in which.

DETAILED DESCRIPTION OF PREFERRED EMBODIMENTS

Figure 1:
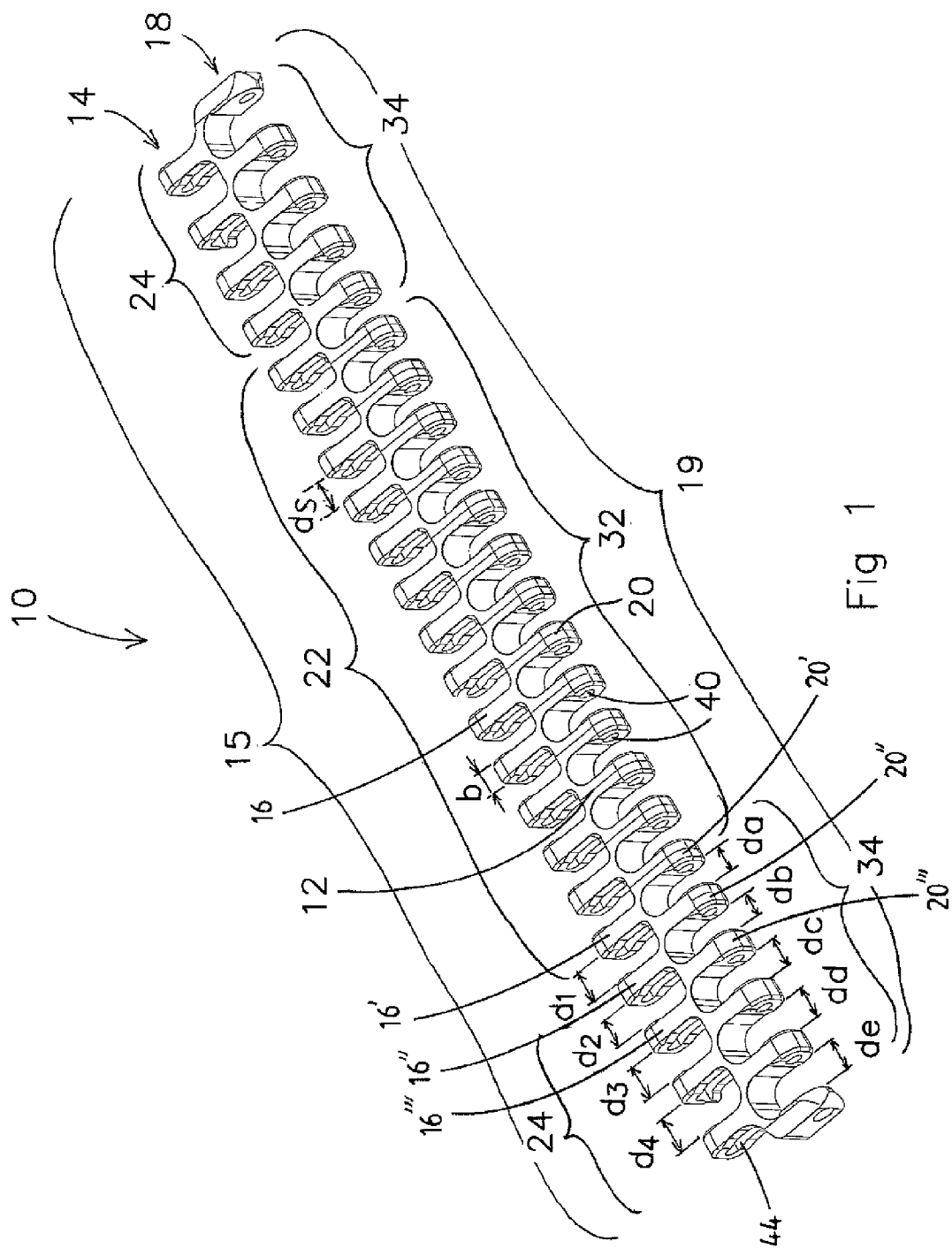
FIG. 1 shows an embodiment of a module according to the invention.

The embodiment of a module 10 according to the invention shown in perspective in FIG. 1 comprises a base element 12 having on a first longitudinal side 14 thereof a first set 15 of first fingers 16, and on the opposite longitudinal side 18 a second set 19 of second fingers 20. The fingers 16 and 20 are staggered relative to each other in the widthwise direction. The fingers of a set in this embodiment are all of the same width b. The first set 15 comprises in the centre a second sub-group 22 of fingers 16, which are situated at a standard distance ds from each other. Situated on either side of the second sub-group 22 is a first sub-group 24 of four fingers 16 each in the case illustrated. The distance d1 between the outermost finger 16' of the second sub-group 22 and the innermost finger 16" of a first sub-group 24 is greater than the standard distance ds. The distance d2 between the innermost finger 16" of the first sub-group 24 and the adjacent finger 16'" of the same sub-group 24 is in turn greater than d1. For the sub-group 24 as a whole the following applies: ds<d1<d2<d3<d4. The second set 19 of second fingers 20 is designed in a comparable manner and comprises in the centre a second sub-group 32 of fingers 20 with the same mutual distance ds. A first sub-group 34 of five fingers 20 is disposed on either side. The distance da between the outermost finger 20' of the second sub-group 34 and the innermost finger 20" of the second sub-group is greater than ds. The distance db between the innermost finger 20" and adjacent ringer 20'" of the first sub-group 34 is greater than da, etc. For this embodiment the following applies: ds<da<db<de<dd<de. The second set 19 of fingers 20 comprises near its top aligned circular apertures 40 extending in the transverse direction for the purpose of accommodating a connecting pin 42. The first set 15 of fingers 16 is provided with aligned transverse apertures 44 extending in the transverse direction and being slotted in the direction between base element 12 and top of the fingers 16.

Figure 2:
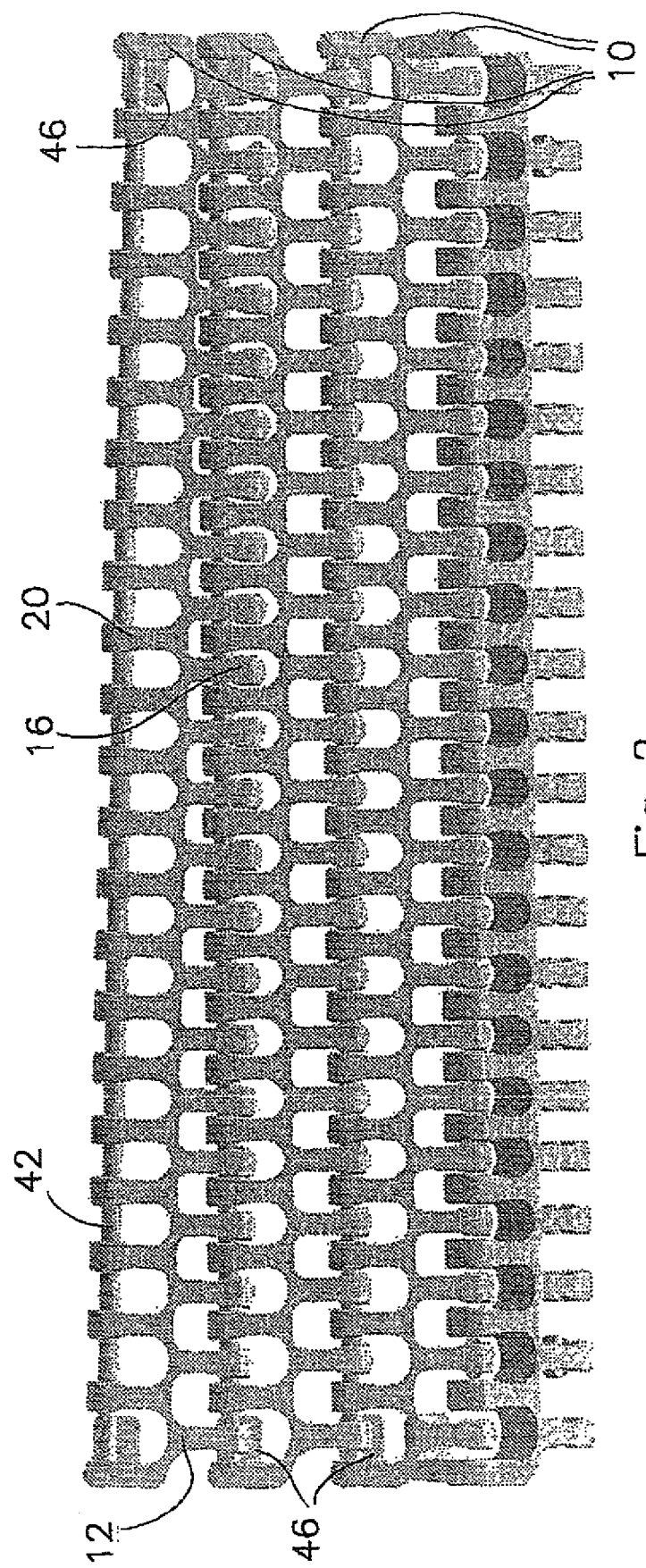
FIG. 2 shows a part of an embodiment of a conveyor belt according to the invention in a curved conveyance path section.

FIG. 2 shows two modules 10, connected by means of a connecting pin 42, in a bend of a conveyance path to be travelled. On account of the greater span between a finger of the first sub-group of a module and the two adjacent fingers of the first sub-group of the adjacent module, locally the connecting pin 42 can bend more than is usual in the art. The tensile force occurring on the outside of the bend is therefore passed on to adjacent fingers. Hold-down tabs 46 are also shown in this figure.

A comparative experiment was carried out with a KVP conveyor belt according to U.S. Pat. No. 5,547,071 and a conveyor belt according to the invention. With a run-out length of 409 mm (1.35 times belt width) a load of 550 N was measured on the outside of a conveyor belt according to the invention at a total tensile force of 900 N, while in the belt according to the prior art a load of 590 N was determined. In other words, the load in the case of the present conveyor belt was 61% on the outside and 39% on the inside, as against 66% and 34% respectively in the case of the conveyor belt according to the prior art.

What is claimed is:

1. A Conveyor belt for following a conveyance path with straight and curved conveyance path sections, which belt comprises:
   module rows of a module or a plurality of modules situated side by side in the transverse direction of the conveyor belt,
   wherein adjacent module rows engage with each other and are connected to each other with connecting pins extending in the transverse direction of the conveyor belt,
   wherein each module comprises a set of first aligned spaced fingers extending in a first direction from the module, and also a set of second aligned spaced fingers extending in a direction opposite to the first direction and in general disposed in a staggered position relative to the first fingers,
   wherein the first fingers and second fingers of adjacent module rows overlap in the longitudinal direction of the conveyor belt and are situated side by side when the module rows are connected to each other with the connecting pins, which pins extend through transverse apertures in the fingers, wherein the transverse apertures of one of the sets of spaced fingers are elongated slotted holes in the longitudinal direction of the conveyor belt, and wherein the mutual distance between at least the three outermost fingers of a set having the same width is greater than the mutual distance between innermost fingers situated side by side at a distance from the above-mentioned at least three outermost fingers,
   wherein the mutual distance between each said at least three outermost fingers is larger than the width of each said at least three outermost fingers; and
   wherein, viewed in the transverse direction of the conveyor belt, all fingers have the same width.

2. The conveyor belt according to claim 1, wherein a set of aligned spaced fingers comprises a first sub-group of a plurality of fingers and a second sub-group of a plurality of fingers, the first sub-group extending from a side edge of the module to the second group, the distance between the fingers of the first sub-group being greater than the distance between the fingers of the second sub-group.

3. The conveyor belt according to claim 2, wherein the distance between the fingers of the second sub-group is constant.

4. The conveyor belt according to claim 2, wherein the distance between the fingers of the first sub-group decreases stepwise, viewed in a direction from the side edge of a module towards the second sub-group of fingers.

5. The conveyor belt according to claim 2, wherein, viewed in the transverse direction of the conveyor belt and in the direction of the side edge of a module, the distance between the fingers of the first sub-group increases stepswise with a factor of about 1.1 to 1.4 with respect to each other.

6. The conveyor belt according to claim 5, wherein said factor is in the range of about 1.1 to 1.2.

7. The conveyor belt according to claim 1, wherein a set of aligned spaced fingers comprises a first sub-group of a plurality of fingers and a second sub-group of a plurality of fingers, the first sub-group extending from a side edge of the module to the second group, the distance between the fingers of the first sub-group being greater than the distance between the fingers of the second sub-group.

8. The conveyor belt according to claim 7, wherein the distance between the fingers of the first sub-group decreases stepwise, viewed in a direction from the side edge of a module towards the second sub-group of fingers.

9. The conveyor belt according to claim 7, wherein the distance between the fingers of the second sub-group is constant.

10. The conveyor belt according to claim 7, wherein, viewed in the transverse direction of the conveyor belt and in the direction of the side edge of a module, the distance between the fingers of the first sub-group increases stepswise with a factor of about 1.1 to 1.4 with respect to each other.

11. The conveyor belt according to claim 10, wherein said factor is in the range of about 1.1 to 1.2.

12. The conveyor belt according to claim 1, wherein a set of aligned spaced fingers comprises first sub-groups of a plurality of fingers on both side edges of the module, and a second sub-group of a plurality of fingers between the abovementioned first sub-groups, the distance between the fingers of the first sub-groups being greater than the distance between the fingers of the second sub-group.

13. The conveyor belt according to claim 12, wherein the distance between the fingers of the second sub-group is constant.

14. The conveyor belt according to claim 12, wherein, viewed in the transverse direction of the conveyor belt and in the direction of the side edge of a module, the distance between the fingers of the first sub-group increases stepswise with a factor of about 1.1 to 1.4 with respect to each other.

15. The conveyor belt according to claim 14, wherein said factor is in the range of about 1.1 to 1.2.

16. The conveyor belt according to claim 12, wherein the distance between the fingers of the first sub-group decreases stepwise, viewed in a direction from the side edge of a module towards the second sub-group of fingers.

17. The conveyor belt according to claim 1, in which wherein a set of aligned spaced fingers comprises first sub-groups of a plurality of fingers on both side edges of the module, and a second sub-group of a plurality of fingers between the abovementioned first sub-groups, the distance between the fingers of the first sub-groups being greater than the distance between the fingers of the second sub-group.

18. The conveyor belt according to claim 17, wherein the distance between the fingers of the second sub-group is constant.

19. The conveyor belt according to claim 17, wherein the distance between the fingers of the first sub-group decreases stepwise, viewed in a direction from the side edge of a module towards the second sub-group of fingers.

20. The conveyor belt according to claim 17, wherein, viewed in the transverse direction of the conveyor belt and in the direction of the side edge of a module, the distance between the fingers of the first sub-group increases stepswise with a factor of about 1.1 to 1.4 with respect to each other.

21. The conveyor belt according to claim 20, wherein said factor is in the range of about 1.1 to 1.2.

22. The conveyor belt according to claim 1, wherein the modules are made of plastic.

23. The conveyor belt according to claim 1, wherein the width of all fingers is 6 mm or 12 mm or 15 mm.

24. A Module made of plastic, wherein each module comprises a set of first aligned spaced fingers extending in a first direction from the module, and also a set of second aligned spaced fingers extending in a direction opposite to the first direction and in general disposed in a staggered position relative to the first fingers,
- wherein the fingers are provided with transverse apertures, wherein the transverse apertures of one of the sets of spaced fingers are elongated slotted holes in the longitudinal direction of the conveyor belt,
- wherein the mutual distance between at least the three outermost fingers of a set having the same width is greater than the mutual distance between fingers situated side by side at a distance from the abovementioned at least three outermost fingers, and
- wherein the mutual distance between each said at least three outermost fingers is larger than the width of each said at least three outermost fingers; and
- wherein, viewed in the transverse direction of the conveyor belt, all fingers have the same width.

* * * * *

UNITED STATES PATENT AND TRADEMARK OFFICE
CERTIFICATE OF CORRECTION

| | |
|---|---|
| PATENT NO. | : 8,083,053 B2 |
| APPLICATION NO. | : 12/199377 |
| DATED | : December 27, 2011 |
| INVENTOR(S) | : Paardekooper et al. |

It is certified that error appears in the above-identified patent and that said Letters Patent is hereby corrected as shown below:

On the cover page after the heading "Related U.S. Application Data", please add the following:
--Foreign Application Priority Data
  Aug. 28, 2007  [NL]  Netherlands  1034297--.

Column 1, line 51, replace "...withstand the fill..." with --withstand the full--.

Signed and Sealed this
Thirteenth Day of March, 2012

David J. Kappos
*Director of the United States Patent and Trademark Office*